(12) United States Patent
Kawaoka et al.

(10) Patent No.: US 8,679,664 B2
(45) Date of Patent: Mar. 25, 2014

(54) BATTERY AND BATTERY SYSTEM

(75) Inventors: Hirokazu Kawaoka, Nissin (JP);
Hiroshi Nagase, Susono (JP); Yasuyuki Tamane, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/682,968

(22) PCT Filed: Nov. 4, 2009

(86) PCT No.: PCT/JP2009/068831
§ 371 (c)(1),
(2), (4) Date: Jul. 28, 2010

(87) PCT Pub. No.: WO2011/055429
PCT Pub. Date: May 12, 2011

(65) Prior Publication Data
US 2012/0015220 A1  Jan. 19, 2012

(51) Int. Cl.
*H01M 10/48* (2006.01)
*H01M 2/12* (2006.01)
*H01M 10/0562* (2010.01)

(52) U.S. Cl.
USPC .................... 429/90; 429/8; 429/83; 429/322

(58) Field of Classification Search
CPC .................................................. H01M 10/488
USPC ............. 429/90, 8, 71, 82, 83, 148, 314, 340, 429/345, 346, 204, 205
See application file for complete search history.

(56) References Cited

U.S. PATENT DOCUMENTS

| 5,407,829 A * | 4/1995 | Wolfbeis et al. .................. 436/1 |
| 6,284,198 B1 * | 9/2001 | Kirollos et al. .................. 422/87 |
| 2004/0063215 A1 * | 4/2004 | Horiuchi et al. .............. 436/121 |
| 2010/0297479 A1 * | 11/2010 | Tsuchida et al. ................ 429/49 |

FOREIGN PATENT DOCUMENTS

| JP | U-3028052 | 6/1996 |
| JP | A-08-339832 | 12/1996 |
| JP | A-2000-260402 | 9/2000 |
| JP | A-2007-200717 | 8/2007 |
| JP | A-2008-103283 | 5/2008 |

(Continued)

OTHER PUBLICATIONS

International Search Report issued on Dec. 15, 2009 in International Application No. PCT/JP2008/068831 (with translation).

(Continued)

*Primary Examiner* — Raymond Alejandro
*Assistant Examiner* — Helen McDermott
(74) *Attorney, Agent, or Firm* — Oliff PLC

(57) ABSTRACT

The present invention is a battery comprising: a power section containing a sulfur-based material; a distinguishing section which discolors by chemical reaction with hydrogen sulfide; and an exterior body incorporating the power section and the distinguishing section, the distinguishing section being observable from outside the exterior body. By checking discoloration of the distinguishing section or the distinguishing means, it is possible to easily detect the presence or absence of hydrogen sulfide in the battery and then judge deterioration of the battery with non-destructive inspection.

2 Claims, 5 Drawing Sheets

(56) References Cited

FOREIGN PATENT DOCUMENTS

| | | |
|---|---|---|
| JP | A-2008-103289 | 5/2008 |
| JP | A-2008-103290 | 5/2008 |
| JP | A-2008-103291 | 5/2008 |
| JP | A-2008-103292 | 5/2008 |
| JP | A-2008-112635 | 5/2008 |
| JP | A-2009-193727 | 8/2009 |
| JP | A-2009-193729 | 8/2009 |

OTHER PUBLICATIONS

Ernst et al., "Ersatz von Bleiacetat durch Bismutnitrat zum Nachweis von Schwefelwasserstoff als Beispiel für den Ersatz von giftigen / umweltschädlichen Chemikalien im Chemieunterricht durch unschädliche Ersatzstoffe," Zentrale für Unterrichtsmedien im Internet e.V., Stand Jul. 17, 2001.

Oct. 10, 2012 German Office Action issued in German Application No. 11 2009 000 073.8 with English-language translation.

\* cited by examiner

BATTERY AND BATTERY SYSTEM

TECHNICAL FIELD

The present invention relates to a battery containing a sulfur-based material and relates to a battery system.

BACKGROUND ART

In recent years, in view of environmental protection, a high-output and high-capacity power source has been demanded for applying to low-emission vehicles such as electric vehicles and hybrid cars. Moreover, other than the automotive field, with global diffusion of mobile devices such as information equipment and telecommunication equipment, secondary batteries which enable to enhance the performance of the mobile devices higher has been required.

Among secondary batteries, a solid-state battery using an inorganic solid electrolyte is particularly excellent in its safety and reliability, compared with a battery having an organic electrolyte using flammable organic solvent. As the solid-state battery, for example, Patent literatures 1 to 4 propose solid-state batteries which use sulfide-based crystallized glass as the solid electrolyte. The sulfide-based solid electrolyte shows high ion conductivity and is capable of enhancing the performance of the solid-state battery higher. However, the sulfide-based solid electrolyte shows low water resistance so that it tends to react with water and produce hydrogen sulfide; whereby ion conductivity of the solid electrolyte declines and the battery is deteriorated. Hence, when using sulfide-based solid electrolyte, to obtain a battery which exhibits excellent safety and reliability, a means for inhibiting reaction with water and a means for detecting deterioration of the battery must be provided.

On the other hand, Patent literature 5 proposes an all-solid-state secondary battery, wherein a hydrogen sulfide detector is arranged in an exterior body of the solid-state battery to be able to detect hydrogen sulfide generated within the battery.

CITATION LIST

Patent Literature

Patent Literature 1: Japanese Patent Application Laid-Open (JP-A) No. 2008-103289
Patent Literature 2: JP-A No. 2008-103290
Patent Literature 3: JP-A No. 2008-103291
Patent Literature 4: JP-A No. 2008-103292
Patent Literature 5: JP-A No. 2009-193727

SUMMARY OF THE INVENTION

Technical Problems

According to the all-solid-state lithium secondary battery of Patent literature 5, it is possible to find out deterioration of the battery by detecting hydrogen sulfide produced inside the battery by using a sensor. However, when facing troubles of sensor such as breakdown of sensor, the produced hydrogen sulfide cannot be adequately detected from outside the battery. Therefore, a battery, which is more reliable, detects the presence or absence of hydrogen sulfide with a simple structure, and of which deterioration is observable, has been required.

Accordingly, an object of the present invention is to provide a more reliable battery which is capable of detecting the presence or absence of hydrogen sulfide inside the battery with a simple structure and thereby be capable of finding out deterioration of the battery. Another object of the invention is to provide a battery system.

Solution to Problems

To solve the above problems, the present invention has the following structure. Namely, the first aspect of the present invention is a battery comprising: a power section containing a sulfur-based material; a distinguishing section which discolors by chemical reaction with hydrogen sulfide; and an exterior body incorporating the power section and the distinguishing section, the distinguishing section being observable from outside the exterior body.

In the first aspect and the following aspects of the invention, the material and shape of the "exterior body" is not particularly limited as long as the exterior body can incorporate the power section(s); a known housing or laminate pack can be used. Alternatively, the exterior body may be used for a battery pack obtained by preparing a plurality of the exterior bodies each of which incorporates power section(s) and packing these exterior bodies further in another exterior body. The term "inside the exterior body" means an inner side from the outer surface (exterior wall) of the exterior body. The term "sulfur-based material" means a material at least apart of which contains sulfur or sulfur compound. More specifically, the sulfur-based material may be a Li-A-S based solid electrolyte material (wherein, A is at least one selected from the group consisting of: P, Ge, B, Si, and I). The term "power section containing a sulfur-based material" means a power section at least a part of which contains a sulfur-based material; for example, there may be a power section where a sulfur-based material is contained in any one of cathode layer, solid electrolyte layer, or anode layer.

In the first aspect of the invention, the exterior body may comprise an observation window. The term "observation window" is not particularly limited as long as it is a window through which inside the exterior body can be observed from outside the exterior body. By the observation window, discoloration of the distinguishing section disposed in the exterior body can be easily checked; thereby, deterioration of the battery can be easily found out.

In the first aspect of the invention, the distinguishing section is preferably made of a material containing at least one selected from the group consisting of: Cu, Ni, Fe, Ag, Zn, Pb, and Mn. This is because such a distinguishing section discolors significantly by reaction with hydrogen sulfide and enables to easily find out deterioration of the battery.

The second aspect of the present invention is a battery comprising: a power section containing a sulfur-based material; an exterior body incorporating the power section; and a distinguishing means at least a part of which discolors when reacting with hydrogen sulfide being arranged at a part of the exterior body.

In the second aspect of the invention, the state where "a distinguishing means is arranged at a part of the exterior body" is not particularly limited as long as the distinguishing means is mounted to the exterior body such that the production of hydrogen sulfide inside the battery can be found out. For instance, there may be a mode obtained by providing a through-hole to the exterior body, removably inserting or fitting the distinguishing means into the through-hole; or a mode where a distinguishing means are sandwiched by the exterior bodies.

In the second aspect of the invention, at least a part of the distinguishing means is preferably made of a material containing at least one selected from the group consisting of: Cu, Ni, Fe, Ag, Zn, Pb, and Mn. This is because such a distinguishing section discolors significantly by reaction with hydrogen sulfide and enables to easily find out deterioration of the battery.

The third aspect of the present invention is a battery system comprising: a fluid passage; a battery containing a sulfur-based material and being arranged in the fluid passage; and a distinguishing means at least a part of which discolors when reacting with hydrogen sulfide being provided at a downstream side of the fluid flow with respect to the battery.

In the third aspect of the invention, the "fluid passage" is not specifically limited as long as it is a passage where hydrogen sulfide produced in the battery can flow toward the downstream direction when a fluid flow occurs or is caused from the battery in one direction (in the downstream direction). Example of the fluid passage may be a duct. It should be noted that the fluid flow includes natural diffusion of gas generated in the battery by concentration gradient. In other words, the "fluid passage" is not restricted to the one intentionally causing a fluid flow by breading and exhausting using air blower. However, to make hydrogen sulfide produced in the battery surely reach the distinguishing means, it is preferable to cause an intentional fluid flow in the fluid passage. The phrase "distinguishing means being provided at a downstream side of the fluid flow with respect to the battery" means that the distinguishing means is provided at a position where the gas generated from the battery reaches or passed through.

In the third aspect of the invention, at least a part of the distinguishing means is preferably made of a material containing at least one selected from the group consisting of: Cu, Ni, Fe, Ag, Zn, Pb, and Mn. This is because such a distinguishing means discolors significantly by reaction with hydrogen sulfide and enables to easily find out deterioration of the battery.

Effects of the Invention

According to the first aspect of the present invention, since the distinguishing section which discolors by chemical reaction with hydrogen sulfide is arranged inside the exterior body and the distinguishing section can be observed from outside the exterior body, it is possible to detect the presence or absence of hydrogen sulfide inside the exterior body by checking discoloration of the distinguishing section from outside the exterior body; thereby it is possible to find out deterioration of the battery with a simple structure.

According to the second aspect of the invention, since a distinguishing means which discolors by chemical reaction with hydrogen sulfide is provided at a part of the exterior body, it is possible to detect the presence or absence of hydrogen sulfide inside the exterior body by checking discoloration of the distinguishing means; thereby it is possible to find out deterioration of the battery with a simple structure.

According to the third aspect of the invention, as the distinguishing means at least a part of which discolors by chemical reaction with hydrogen sulfide is provided at a downstream side of the fluid flow from the battery, by the discoloration of the distinguishing means, it is possible to detect the presence or absence of hydrogen sulfide gas from the battery; thereby it is possible to find out deterioration of the battery with a simple structure.

Figure 1:
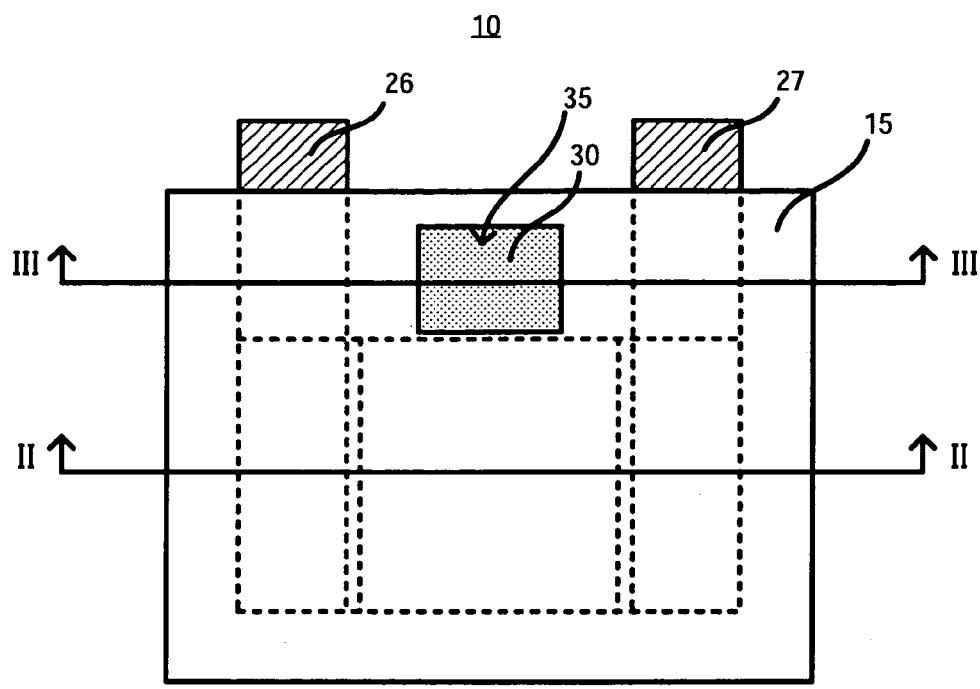
FIG. 1 is a plan schematically showing an appearance of a battery 10 of the invention.

LIST OF REFERENCE NUMERALS 10 battery
15 exterior body
20 power section
21 cathode layer
22 anode layer
23 solid electrolyte layer
24 cathode current collector
25 anode current collector
26 cathode terminal
27 anode terminal
30 distinguishing member (distinguishing section)
31 transparent member (observation window)
35 through-hole
36 space
100 battery
115 exterior body
120 unit cell
125 controller
130 space
135 through-hole
150 distinguishing means
151 plug-in member
152 distinguishing member, membrane
153 sandwiching member
154 through-hole
155 supporting member
200 battery system
201 battery
202 inlet port
203 outlet port
204 housing (fluid passage)
205 duct
250 distinguishing means

DESCRIPTION OF MODES FOR CARRYING OUT THE INVENTION

Hereinafter, the present invention will be described by way of an all-solid-state lithium secondary battery using a sulfide-based solid electrolyte. However, the invention is not particularly limited to the embodiment; the invention can be applied to another type of battery which may produce hydrogen sulfide in the battery (for example, molten carbonate fuel cell, sodium-sulfur battery).

1. First Embodiment of the Invention

Figure 2:
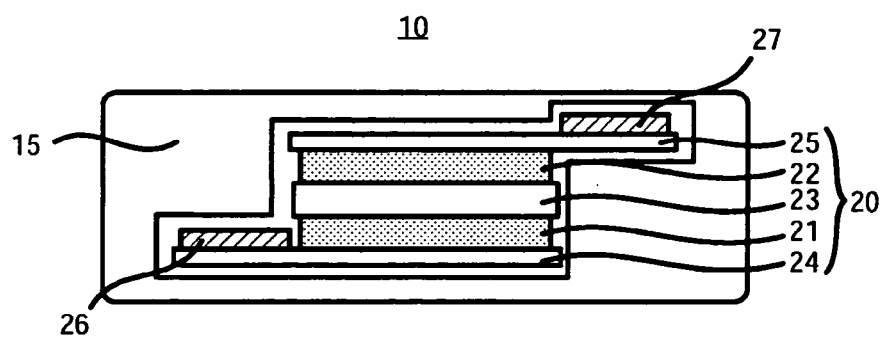
FIG. 2 is a cross-sectional view taken in the direction of the arrows along the line II-II of FIG. 1.
Figure 3:
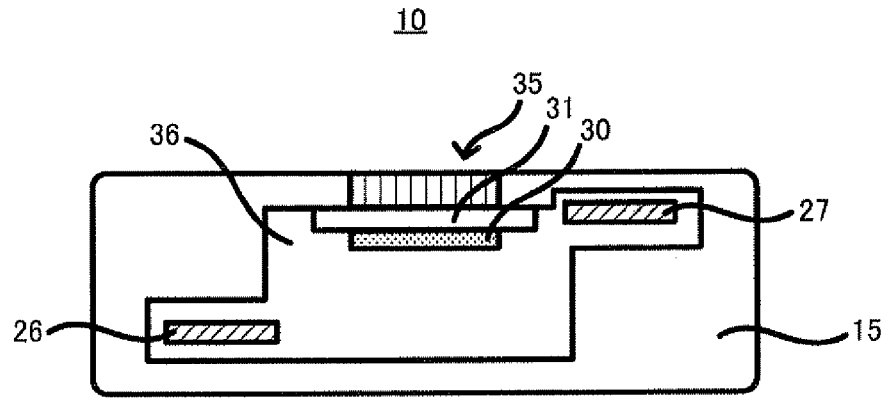
FIG. 3 is a cross-sectional view taken in the direction of the arrows along the line III-III of FIG. 1.

FIGS. 1 to 3 are schematic views illustrating the appearance and internal structure of the battery 10 according to the first embodiment of the present invention. FIG. 1 shows an exterior of the battery 10 seen from the side where the distinguishing member 30 functioning as a distinguishing section can be seen. FIG. 2 is a cross-sectional view taken in the direction of the arrows along the line II-II of FIG. 1; and FIG. 3 is a cross-sectional view taken in the direction of the arrows along the line III-III of FIG. 1. As shown in FIG. 2, the battery 10 comprises: a power section 20 comprising a cathode layer 21, an anode layer 22, a solid electrolyte layer 23 arranged between the cathode layer 21 and the anode layer 22, a cathode current collector 24, and an anode current collector 25; a cathode terminal 26 mounted to the cathode current collector 24; an anode terminal 27 mounted to the anode current collector 25; and an exterior body 15 incorporating the power section, the cathode terminal 26, and the anode terminal 27. The cathode terminal 26 and the anode terminal 27 are provided such that these terminals project from inside to outside the exterior body 15; by these terminals, the electric energy can be taken to outside the battery. Moreover, as shown in FIG. 3, with respect to the battery 10, a through-hole 35 is provided at a part of the exterior body 15; a transparent member 31 is provided at the bottom of the through-hole 35, and a distinguishing member 30 is provided to the inner side of the transparent member 31. Further, inside the exterior body 15, a space 36 exists; therefore the air generated in the power section 20 can reach the distinguishing member 30 through the space 36. The air battery 10 will be described as follows on the element basis.

<Exterior Body 15>

The exterior body 15 of the battery 10 is not particularly restricted as long as it can suitably incorporate the below-described power section 20 and distinguishing member 30. In FIGS. 1 to 3, the power section 20 and the like are laminated and inserted into the exterior body 15; namely, as the exterior body 15, a laminated film comprising an aluminum foil and a resin film is used. However, the exterior body 15 is not limited to the mode; for example, a housing made of aluminum may be used. The shape of the exterior body 15 is not particularly limited as long as it is capable of incorporating the power section 20 and so on. To be able to observe the distinguishing member 30 provided inside the exterior body 15, the exterior body 15 is provided with a through-hole 35. The shape and size of the through-hole 35 is not particularly limited as long as the through-hole enables observation of the distinguishing member 30 inside the exterior body 15. Moreover, as shown in FIG. 3, to make the gas generated from the power section 20 reach the distinguishing member 30, a predetermined space 36 is provided in the exterior body 15. It should be noted that the space 36 may be a space made by the gas generated inside the battery 10. In other words, it is not necessary to provide the space 36 in the exterior body 15 in advance; so, the exterior body 15 is a mode where the gas generated in the battery 10 at least can reach the distinguishing member 30.

<Power Section 20>

The power section 20 is incorporated in the exterior body 15; the power section 20 comprises: a cathode current collector 24; a cathode layer 21 arranged on at least one surface of the cathode current collector 24; an anode current collector 25; an anode layer 22 arranged on at least one surface of the anode current collector 25; and a solid electrolyte layer 23 arranged between the cathode layer 21 and the anode layer 22.

(Cathode Layer 21)

The cathode layer 21 is a layer containing a cathode active material and a solid electrolyte; it may optionally contain a conductive additive and a binder. When the battery 10 is an all-solid-state lithium secondary battery, examples of the active material include: $LiCoO_2$, $LiNiO_2$, different-element substituted Li—Mn spinel represented by $Li_{1+x}Ni_{1/3}Mn_{1/3}Co_{1/3}O_2$, $LiMn_2O_4$, $Li_{1+x}Mn_{2-x-y}M_yO_4$ (wherein, M is one or more selected from: Al, Mg, Co, Fe, Ni, and Zn); $Li_xTiO_y$, and $LiMPO_4$ (wherein, M is selected from: Fe, Mn, Co, and Ni); $V_2O_5$, $MoO_2$, $TiS_2$; a carbon material such as graphite and hard carbon; LiCoN, $Li_xSi_yO_z$; a lithium metal or a lithium alloy (i.e. LiM: M is any one of Sn, Si, Al, Ge, Sb, and P); a lithium storage intermetallic compound (i.e. $Mg_xM$: M is any one of Sn, Ge, and Sb; or $N_ySb$: N is any one of In, Cu, and Mn); and derivatives thereof. Here, there is not a clear difference between the cathode active material and the below-described anode active material; so, a lithium secondary battery having an arbitrary voltage can be produced using one showing noble potential as the cathode and the other showing base potential as the anode by comparing charge-discharge potential of two kinds of compounds. The solid electrolyte may be the one containing at least elements lithium and sulfur. Particularly, a Li-A-S based solid electrolyte (wherein, A is at least one selected from: P, Ge, B, Si, and I) is preferably used. Specific examples thereof include: $Li_2S—P_2S_5$, $LiGe_{0.25}P_{0.75}S_4$, $Li_2S—B_2S_3$, $Li_2S—SiS_2$, or another electrolyte where LiI or $Li_2PO_4$ are added thereto. The mixing ratio of the cathode active material and the solid electrolyte is not particularly restricted as long as the mixing ratio is appropriate enough to operate the battery 10. As the conductive additive, conventional conductive additives can be used without any restriction; for example, a carbon material such as acetylene black is preferably used. In addition, as the binder, conventional binders can be used without any restriction; for example, a fluorine-based resin such as polyvinylidene fluoride or a rubber-type resin such as stylene-butadiene rubber is preferably used.

(Cathode Current Collector 24)

The cathode current collector 24 is not particularly limited as long as it is a current collector used for the battery 10 containing a sulfur-based material; for instance, a metallic foil, a metallic mesh, and a metal deposited film can be used. More specific examples include: a metallic foil or mesh made of Al, V, Au, Pt, Mg, Ti, Co, and a stainless steel; alternatively, a sheet where a metal such as V, Al, Pt, and Au is deposited on a glass plate, a silicon plate, or a film made of polyamide, polyimide, PET (i.e. polyethylene terephthalate), PPS (i.e. poly phenylene sulfide), or polypropylene. The thickness and size of the cathode current collector 24 are not particularly limited.

By preparing a cathode paste containing each of the above substance, applying the paste to the cathode current collector 24, and drying the paste, a cathode layer 21 can be formed on the cathode current collector 24. The application method of the cathode paste is not particularly limited; application can be carried out by a known method such as doctor-blade method. The thickness of the cathode layer 21 after drying is not specifically limited. It should be noted that although FIG. 2 shows an embodiment where the cathode layer 21 is provided only on one surface of the cathode current collector 24, the cathode layer 21 may be provided on both sides of the cathode current collector 24.

(Anode Layer 22)

The anode layer 22 is a layer containing an anode active material and a solid electrolyte; the anode layer 22 may optionally contain a conductive additive and a binder. The anode active material in a case where the battery 10 is used as an all-solid-state lithium secondary battery is the same as the above description of the cathode active material. In other words, among the above listed active materials, charge-discharge potential of the selected two kinds of compounds is compared; then, one compound showing noble potential can be used as the cathode active material and the other showing base potential is used as the anode active material. In the same manner as the case of the cathode layer 21, the solid electrolyte may be the one containing at least elements lithium and sulfur; the above-described solid electrolyte can be used. The mixing ratio of the anode active material and the solid electrolyte is not specifically limited as long as the mixing ratio is appropriate enough to operate the battery 10. The conductive additive and the binder may be a known material without any limitation; the above-described material can be used.

(Anode Current Collector 25)

The anode current collector 25 is not particularly limited as long as a current collector to be used for the battery 10 containing a sulfur-based material; for instance, a metallic foil, a metallic mesh, and a metal deposited film can be used. Specific examples thereof include: a metallic foil or mesh made of a stainless steel, Al, V, Au, Pt, Mg, Ti, or Co; alternatively, a sheet where a metal such as V, Al, Pt and Au is deposited on a glass plate, a silicon plate, or a film made of polyamide, polyimide, PET, PPS, or polypropylene. The thickness and size of the anode current collector 25 are not particularly limited.

By preparing an anode paste containing each of the above substance, applying the paste to the anode current collector 25, and drying it, an anode layer 22 can be formed on the anode current collector 25. The application method of the cathode paste is not particularly limited; application can be carried out by a known method such as doctor-blade method. The thickness of anode layer 22 after drying is not specifically limited. It should be noted that although FIG. 2 shows an embodiment where the anode layer 22 is provided only on one surface of the anode current collector 25, the cathode layer 22 may be provided on both sides of the anode current collector 25.

(Solid Electrolyte Layer 23)

The solid electrolyte layer 23 is a layer provided between the cathode layer 21 and the anode layer 22, the solid electrolyte layer 23 is not particularly limited as long as it is made of a sulfide-based solid electrolyte material. Examples of the sulfide-based solid electrolyte material may be the same one used as the above-described solid electrolyte contained in the cathode layer 21 and the anode layer 22.

The forming method of the solid electrolyte layer 23 is not particularly limited as long as it is a method capable of providing the solid electrolyte layer 23 between the cathode layer 21 and the anode layer 22. For instance, a method for adequately forming the solid electrolyte layer 23 between the cathode layer 21 and the anode layer 22, comprising the steps of: providing a cathode layer 21 on a cathode current collector 24; applying a solid electrolyte (i.e. a paste containing a solid electrolyte) on the entire cathode layer 21 and drying the solid electrolyte; and superposing the above-described the anode layer 22 and the anode current collector 25, in the order mentioned, on the formed solid electrolyte layer 23. Alternatively, the solid electrolyte layer 23 may be formed on the anode layer 22; then, the cathode layer 21 and the cathode current collector 24, in the order mentioned, can be superposed thereon. The thickness of the solid electrolyte layer after drying is not particularly limited. In this way, the power section 20 comprising, in the order mentioned: a cathode current collector 24; a cathode layer 21; a solid electrolyte layer 23; an anode layer 22; and an anode current collector 25 can be formed.

<Cathode Terminal 26>

The cathode terminal 26 is mounted to a part of the cathode current collector 24 (i.e. a region of the cathode current collector 24 where the cathode paste 21 is not applied) to take electric energy generated in the power section 20 to outside the battery. The cathode terminal 26 may be a conventional metal terminal without any restrictions. For example, a tab made of a stainless steel can be the cathode terminal 26. The shape and size of the cathode terminal 26 is not specifically limited as long as the cathode terminal 26 can take the electric energy from inside to outside of the battery 10. The method for mounting the cathode terminal 26 to the cathode current collector 24 is not particularly limited; for example, the cathode terminal 26 can be mounted to the cathode current collector 24 by a welding method using a conventional welding means.

<Anode Terminal 27>

The anode terminal 27 is mounted to a part of the anode current collector 25 (i.e. a region of the anode current collector 25 where the anode paste 22 is not applied) to take electric energy generated in the power section 20 to outside the battery. As for the anode terminal 27, in the same manner as the cathode terminal 26, a conventional metal terminal can be used without any restrictions. For example, a tab made of a stainless steel can be the anode terminal 27. The shape and size of the anode terminal 27 is not specifically limited as long as the anode terminal 27 can take the electric energy from inside to outside of the battery 10. The method for mounting the anode terminal 27 to the anode current collector 25 is not particularly limited; for example, the anode terminal 27 can be mounted to the anode current collector 25 by a welding method using a conventional welding means.

It should be noted that although FIG. 2 shows an embodiment where a power section 20 as well as a set of the cathode terminal 26 and the anode terminal 27 are incorporated in the exterior body 15; a plurality of the power sections and terminals may be incorporated in the exterior body 15. Moreover, there may be an embodiment where a plurality of the power sections 20 are laminated (for example, a state where a plurality of bipolar electrodes are laminated).

<Distinguishing Member 30>

The distinguishing member 30 is a member which functions as a distinguishing section for detecting the presence or absence of hydrogen sulfide inside the battery 10 (i.e. inside the exterior body 15) and the distinguishing member 30 contains a material which discolors by chemical reaction with hydrogen sulfide. The material is not specifically limited as long as it can discolor by chemical reaction with hydrogen sulfide; a metal excluding titanium, tungsten, chromium, and a stainless steel, as well as an organic compound which discolors by chemical reaction with hydrogen sulfide can be used. Due to the significant discoloration by reaction with hydrogen sulfide, a material selected from: Cu, Ni, Fe, Ag, Zn, Pb, and Mn is preferably used. Table 1 shows specific examples of discoloration of metals when reacting with hydrogen sulfide.

TABLE 1

| Metal element | Discoloration |
|---|---|
| Cu | Copper → Bronze → Black |
| Ni | Bronze → Black |
| Fe | Grey black or Pale black brown |

TABLE 1-continued

| Metal element | Discoloration |
|---|---|
| Ag | Black |
| Zn | Whitish yellow |
| Pb | Black |
| Mn | Black brown/Reddish-brown |

By placing a membrane-type or massive-type of the above distinguishing member 30 in the exterior body 15 in the observable manner through the through-hole 35 and the below-described transparent member 31 provided to the exterior body 15, it is possible to detect the presence or absence of hydrogen sulfide inside the battery 10 by checking degree of discoloration of the distinguishing member 30.

<Transparent Member 31>

The transparent member 31, in FIG. 3, is a member which is disposed inside the exterior body 15 in a manner to block the through-hole 35 provided in the exterior body 15, the transparent member 31 functions as an observation window through which inside of the battery 10 can be observed. The transparent member 31 is not particularly restricted as long as it is transparent enough to observe inside the exterior body 15 from the outside; examples thereof include: resins such as polyethylene resin, acrylic resin, and polyprolylene resin; glass; and transparent ceramics. The transparent member 31 is mounted to the through-hole 35 portion of the portion of the exterior body 15 by a conventional welding method, binding method, and fixing method. Particularly, when using a resin film such as poly (methyl methacrylate) resin, polycarbonate, and polyethylene, the transparent member 31 can be easily thermally adhered to the exterior body 15; whereby it is preferable.

The distinguishing member 30 is disposed inside the exterior body 15 through the through-hole 35 (and the transparent member 31) such that the distinguishing member 30 is observed from outside the exterior body 15. For example, as shown in FIG. 3, the distinguishing member 30 can be adequately disposed inside the exterior body 15 by the steps of: depositing a material, which can form the distinguishing member 30, in a membrane form to the transparent member 31 made of a resin film by using a known sputtering apparatus; thermally adhering the transparent member 31 to the periphery of the through-hole 35 such that the deposited membrane faces inside the exterior body 15.

As above, the battery 10 comprises: a power section 20 containing a sulfur-based material; a distinguishing member 30 which discolors by chemical reaction with hydrogen sulfide; and an exterior body 15 incorporating the power section 20 and distinguishing member 30, wherein the distinguishing member 30 can be observed from outside the exterior body 15 through a through-hole 35 provided to the exterior body 15. Therefore, it is possible to observe, from outside the exterior body 15, the presence or absence of hydrogen sulfide produced inside the exterior body 15 by checking discoloration of the distinguishing member 30; whereby it is possible to easily find out deterioration of the battery 10 with simple structure. In addition, since the exterior body 15 is provided with the transparent member 31 which functions as an observation window, the distinguishing member 30 disposed inside the exterior body 15 can be easily observed.

Figure 4:
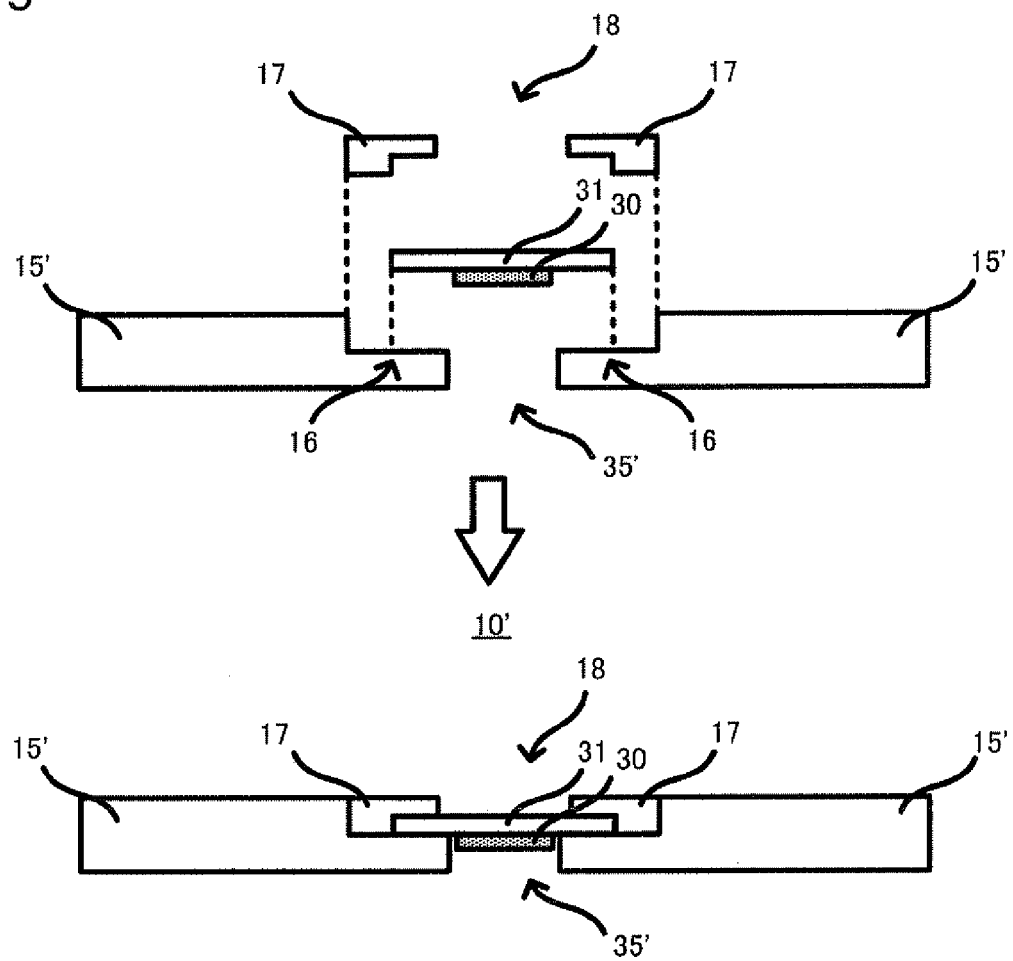
FIG. 4 is a view for illustrating the modified example of the battery 10.

It should be noted that the battery 10 is not limited to the above described embodiment. FIG. 4 is a plan illustrating a battery 10' as a modified example of the battery 10 according to the first embodiment of the invention. In FIG. 4, the upper side of the sheet is the outer side of the exterior body 15' and the lower side of the sheet is the inner side of the exterior body 15'. In FIG. 4, with respect to the exterior body 15', a part where the distinguishing member 30 and transparent member 31 are provided is particularly magnified; the rest of the elements constituting the battery may be the same as those of the battery 10.

As shown in FIG. 4, battery 10' comprises a housing as an exterior body 15'. The exterior body 15' is, for example, an aluminum housing. The wall thickness of the exterior body 15' is not particularly limited as long as the distinguishing member 30 and the transparent member 31 can be adequately disposed within the exterior body 15'. At a part of the exterior body 15', concave portion 16, 16 is provided; at the substantially center portion of the concave portion 16, 16, a through-hole 35' is provided. On the other hand, the distinguishing member 30 is deposited on the surface of the transparent member 31. The transparent member 31 is disposed on the exterior body 15' from outside of the exterior body 15' such that the distinguishing member 30 faces the inner side of the exterior body 15' and the outer periphery of the transparent member 31 is mounted on the periphery portion of the through-hole 35' (i.e. a part of the concave portion 16, 16). Moreover, welding member 17, 17 is fitted into the concave portion 16, 16 while holding the outer periphery of the mounted transparent member 31; then, the transparent member 31 is fixed with the exterior body 15' by welding the welding member 17, 17 to the exterior body 15' and the distinguishing member 30 is provided in the exterior body 15'. The welding member 17, 17 is made of a material weldable to the exterior body 15'; for example, it may be made of aluminum. At the substantially center of the welding member 17, 17, a through-hole 18 is provided; through the transparent member 31, the distinguishing means 30 can be observed from outside. Even with such an embodiment, the distinguishing member 30 can be visually observed from outside of the exterior body 15' so that by discoloration of the distinguishing member 30, it is possible to check, from outside the exterior body 15', the presence or absence of hydrogen sulfide inside the battery. Hence, it is possible to find out deterioration of the battery 10' with simple structure.

2. Second Embodiment of the Invention

Figure 5:
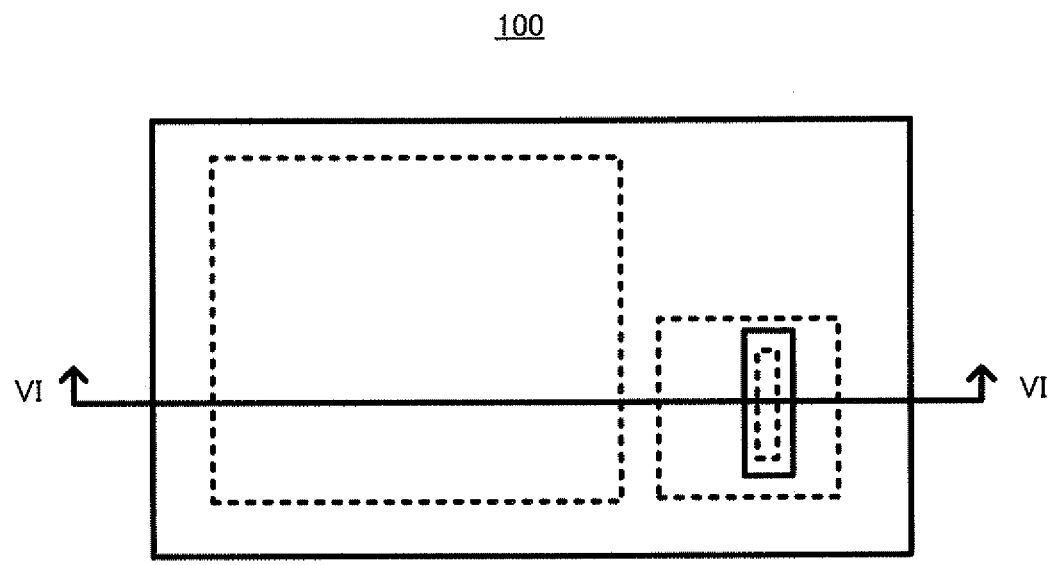
FIG. 5 is a plan schematically showing an appearance of a battery 100.
Figure 6:
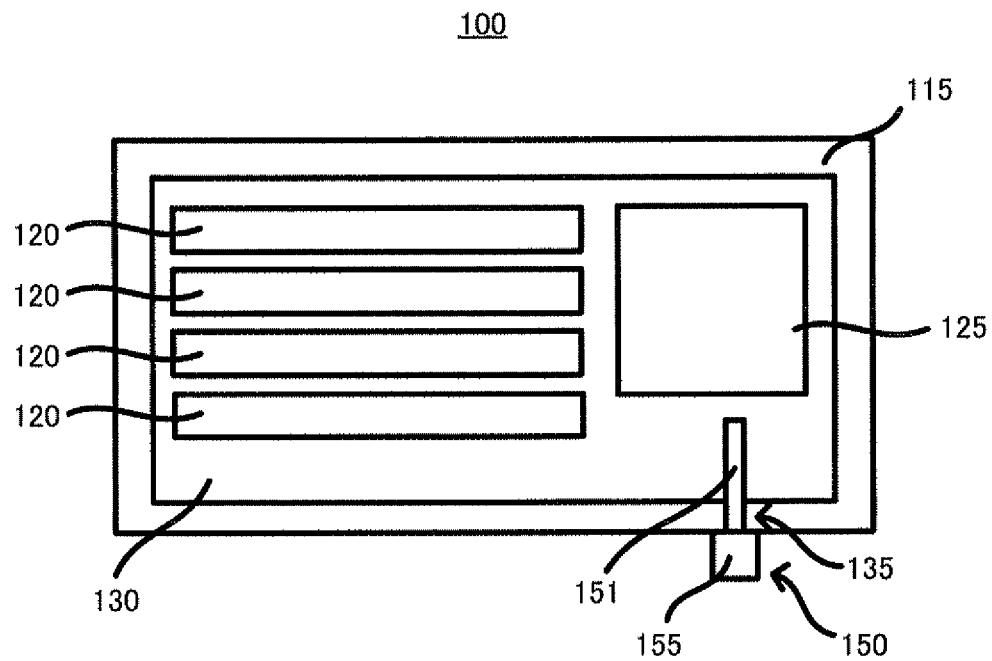
FIG. 6 is a cross-sectional view taken in the direction of the arrows along the line VI-VI of FIG. 5.

FIGS. 5 and 6 are schematic views for illustrating the appearance and the internal structure relating to the battery 100 according to the second embodiment of the present invention. FIG. 5 shows an appearance of the battery 100 seen from the side where a distinguishing means 150 is provided; FIG. 6 schematically shows a cross-sectional view taken in the direction of the arrows along the line VI-VI of FIG. 5. As shown in FIG. 6, the battery 100 comprises an exterior body 115; inside the exterior body 115, unit cells 120, 120, ... each of which includes a power section containing a sulfur-based material and a controller 125 for controlling each unit cell 120, 120, ... are provided. In addition, a through-hole 135 is provided at a part of the exterior body 115; into the through-hole 135, a distinguishing means 150 is removably inserted from outside the exterior body 115. The distinguishing means 150 comprises a plug-in member 151 and a supporting member 155, wherein the plug-in member 151 is inserted into the exterior body 115. Moreover, the supporting member 155 has a size and shape large enough not to be inserted to the inside of the through-hole 135; because of this, the distinguishing means 150 can be easily withdrawn. Inside the exterior body 115, a space 130 is provided so that the gas generated in each unit cell 120, 120, . . . passes through the space 130 and eventually reaches a plug-in member 151 of the distinguishing means 150.

<Exterior Body 115>

The material, shape, and size of the exterior body 115 is not specifically limited as long as the exterior body 115 can not only adequately incorporate the power sections 120, 120, and the controller 125 but also allow the distinguishing means 150 to adequately fit with the exterior body 115. In FIGS. 5 and 6, the exterior body 115 may be an aluminum housing. In addition, a part of the exterior body 115 is provided with a through-hole 135. Moreover, the through-hole 135 has a size and shape where the plug-in member 151 of the distinguishing means 150 can be inserted into the through-hole 135 but the supporting member 155 cannot be inserted into it.

<Unit Cell 120, Controller 125>

The unit cell 120 comprises a power section containing a sulfur-based material. As the power section, there may be the above-described power section 20. The unit cell 120 may be formed by providing a cathode terminal and an anode terminal (not shown) to such a power section, and then laminating them by using a conventional laminate film. The unit cell 120 is provided with controlling terminals (not shown); by connecting the terminals to the controller 125, each of the unit cell 120, 120, can be independently controlled. The controller 125 is an apparatus comprising a controlling circuit and is capable of controlling each of the unit cell 120, 120 . . . . As the controller 125, a known controlling apparatus can be used.

<Distinguishing Means 150>

The distinguishing means 150 is to be inserted into the through-hole 135 of the exterior body 115 and is a means to detecting the presence or absence of hydrogen sulfide inside the exterior body 115. The distinguishing means 150 comprises a plug-in member 151 and a supporting member 155 for supporting the plug-in member 151.

(Plug-In Member 151)

The plug-in member 151 is a member which is inserted from outside the exterior body 115 to the space 130 inside the exterior body 115 through the through-hole 135 and at which gas generated from the unit cells 120, 120, . . . can arrive. At least a part of the plug-in member 151 is constituted by a material which discolors by chemical reaction with hydrogen sulfide; by checking the discoloration of the material, it is possible to detect the presence or absence of hydrogen sulfide inside the exterior body 115.

(Supporting Member 155)

The supporting member 155 is a member which is fixed with an end of the plug-in member 151 and which has a size and shape large enough not to be inserted into the through-hole 135. When the plug-in member 151 is inserted into the through-hole 135, the supporting member 155 exists outside the through-hole 135. When withdrawing the distinguishing means 150 from the exterior body 115 to distinguish the presence or absence of hydrogen sulfide inside the exterior body 115, by holding and withdrawing the supporting member 155 by hand, the operator can withdraw the plug-in member 151 from the through-hole 135; whereby it is possible to observe discoloration of the plug-in member 151. On the other hand, by holding the supporting member 155 by hand and press-fitting the plug-in member 151 into the through-hole 135 until the supporting member 155 clutches the end of the through-hole 135, the operator can fit the distinguishing means 150 with the exterior body 115.

Figure 7:
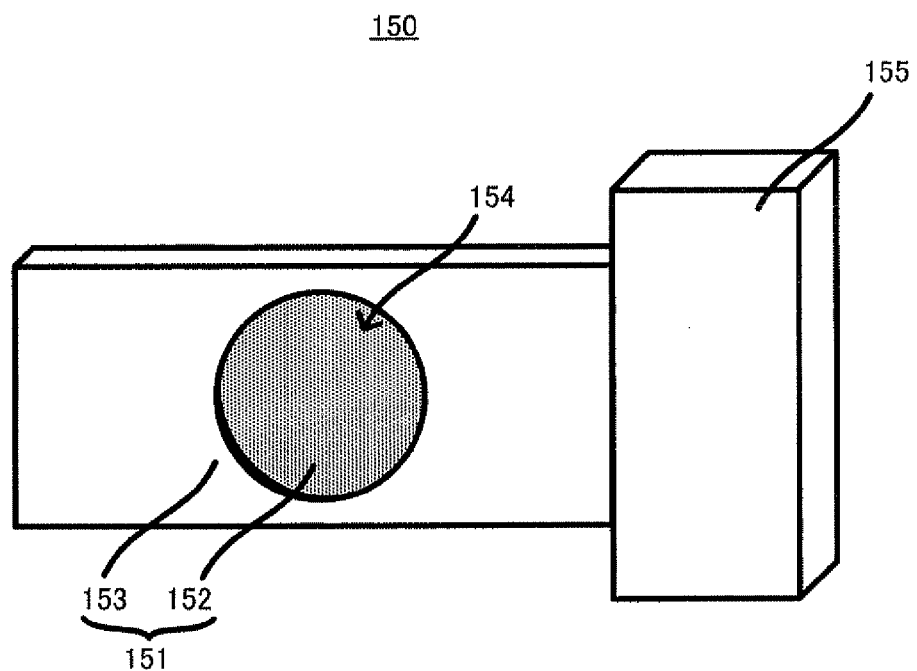
FIG. 7 is a plan for illustrating a distinguishing means 150.
Figure 8:
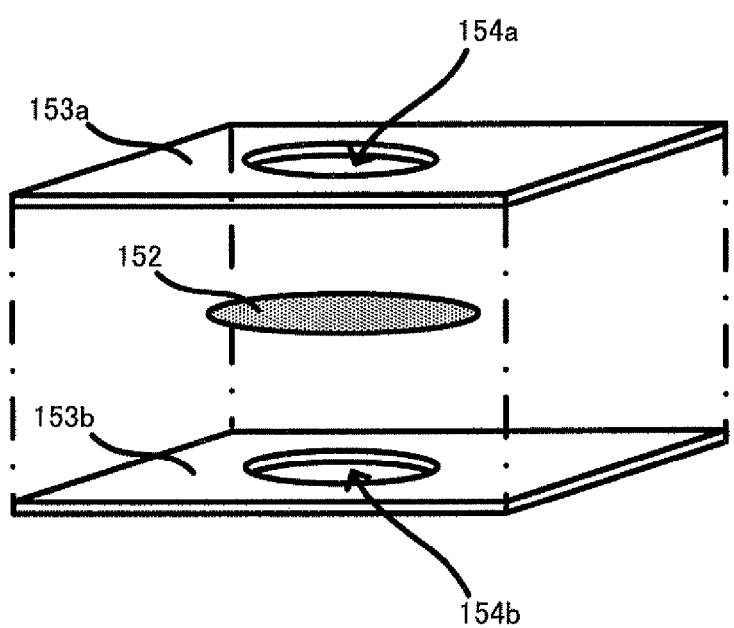
FIG. 8 is a plan showing a structure of a plug-in member 151 of the distinguishing means 150.

The distinguishing means 150 may has a structure, for example, as shown in FIGS. 7 and 8. As shown in FIG. 7, the plug-in member 151 of the distinguishing means 150 comprises: a sandwiching member 153 a part of which a through-hole 154 is provided; and a distinguishing section 152 being configured to shield the through-hole 154. The sandwiching member 153 is a plate-shaped member to sandwich the distinguishing section 152. The material of the sandwiching member 153 is not particularly restricted as long as it can adequately sandwich the distinguishing section 152 and it has a certain strength which enables to insert into the through-hole 135; examples thereof may be resin such as polypropylene, glass, ceramics, and metal. The thickness of the sandwiching member 153 is not particularly limited. The distinguishing section 152 is made of a material which discolors by reaction with hydrogen sulfide; particularly, in view of significant discoloration by reaction with hydrogen sulfide, the material may preferably be any one of Cu, Ni Fe, Ag, Zn, Pb, and Mn. As the distinguishing section 152, a membrane-type member is suitably used. The thickness of the membrane is not specifically limited as long as discoloration by reaction with hydrogen sulfide can be observed. On the other hand, an end of the plug-in member 151 is fixed by the supporting member 155. The supporting member 155 may be the one which has a certain strength where the distinguishing means 150 can be removably insert into the exterior body 115 and can hold the plug-in member 151. The shape and material thereof are not particularly limited. It should be noted that, as above, the supporting member 155 is designed to have a size and shape where the supporting member 155 cannot be inserted into the through-hole 135.

The method for producing the plug-in member 151 in which distinguishing section 152 is adequately provided at the through-hole 154*a*, 154*b* area, for example, as seen from FIG. 8, comprises: preparing a sandwiching member 153*a* having a through-hole 154*a*, a sandwiching member 153*b* having a through-hole 154*b*, a membrane 152 (i.e. a distinguishing section 152) made of a material which discolors by reaction with hydrogen sulfide; and sandwiching the membrane 152 between the sandwiching members 153*a*, 153*b*. An end of the obtained plug-in member 151 is fixed with the supporting member 155 to produce a distinguishing means 150.

As above, the battery 100 comprises: an exterior body 115; unit cells 120, 120, . . . each of which has a power section containing a sulfur-based material and these of which are incorporated in the exterior body 115, wherein the through-hole 135 and the distinguishing means 150 are provided at a part of the exterior body 115 and the distinguishing means 150 can be removably provided. Hence, by checking the discoloration of the distinguishing means 150, it is possible to distinguish the presence or absence of hydrogen sulfide inside the exterior body 115, thereby possible to judge deterioration of the battery 100 with a simple structure.

As the battery 100 of the second embodiment of the invention, an embodiment in which the distinguishing means 150 is provided at a part of the exterior body 115. However, the distinguishing means is not limited to the mode; for example, in the same manner as that of the battery 10 according to the first embodiment, it may be a mode where the distinguishing member 30 is provided in the exterior body 115 to observe the distinguishing member 30 from outside the exterior body 115 through the observation window.

With respect to the battery 10 and the battery 100, for instance, at a time of battery manufacturing, defective cell in the manufacturing process can be easily distinguished by checking the discoloration of the distinguishing member 30 and the distinguishing means 150 by visual observation, an image-identifying machine, a reflectometer, or etc. Moreover, even at a time of using battery, deterioration of the battery can be easily found out so that the necessity for change of the battery can be easily determined. It should be noted that at a time of using battery, discoloration of the distinguishing members 30, 152 is monitored by an image-identifying machine or a reflectometer; when detecting abnormal condition (discoloration), operation of the battery is automatically stopped to ensure the security, or a visually-observable lump is lighted up to immediately inform the battery operator of deterioration of the battery.

3. Third Embodiment of the Invention

Figure 9:
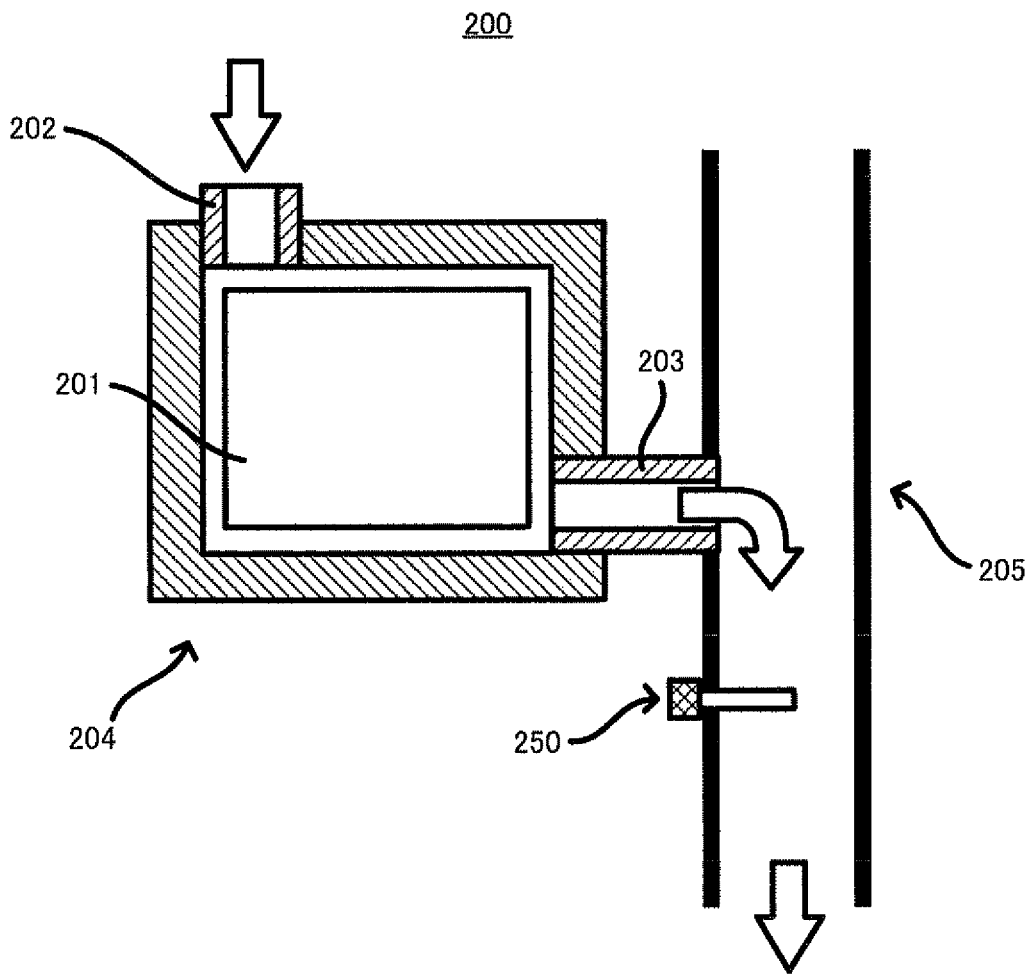
FIG. 9 is a plan for illustrating a battery system 200.

FIG. 9 is a schematic view illustrating a structure regarding the battery system 200 of the third embodiment of the present invention. As shown in FIG. 9, the battery system 200 comprises: a battery 201 comprising unit cells each of which has a power section containing a sulfur-based material; a housing 204 which incorporates the battery 201 and which is provided with an inlet port 202 and an outlet port 203, to function as fluid passage; and a duct 205 connected to the outlet port 203. The housing 204 fluidly communicates with the duct 205. While, at a downstream side of the flow with respect to the battery 201, a distinguishing means 250 is provided.

<Battery 201>

The battery 201 comprises: at least one unit cell, each of which comprising a power section containing a sulfur-based material; and an exterior body incorporating the unit cell(s). The unit cell used for the battery 201 is not particularly restricted as long as it has a power section containing a sulfur-based material; for example, a unit cell 120 of the second embodiment can be used. The material and shape of the exterior body is not specifically limited as long as the exterior body can incorporate the unit cell; for example, at least one unit cell can be incorporated in a laminated film made of a resin film and a metallic foil. As seen above, the battery 201 whose unit cell is incorporated in the exterior body is provided inside the housing 204.

<Housing 204, Duct 205>

The battery 201 is provided inside the housing 204; the inlet port 202 and the outlet port 203 are provided to the housing 204. In addition, in the housing 204, a fan (not shown) is provided to generate fluid flow intentionally in the housing 204. The shape and size of the housing 204 is not particularly limited as long as the battery 201 can be adequately disposed therein. The material of the housing 204 is not particularly limited, either; for example, a housing made of a metal such as aluminum or a stainless steel can be used. The housing 204 may be a vehicle room provided at a part of the vehicle. As the inlet port 202 and the outlet port 203, for example, a conventional fluid passage may be used to connect to the housing 204. Further, in the housing 204, a fan or the like is optionally provided to intentionally promote intake and exhaust of the fluid. The duct 205 is a fluid passage which is connected to the outlet port 203 of the housing 204; the material, shape, and size are not specifically limited. For example, a fluid passage provided to a vehicle may be the duct 205.

<Distinguishing Means 250>

The distinguishing means 250 is provided at a downstream side of the fluid flow with respect to the battery 201, where the gas generated from the battery 201 can reach. The distinguishing means 250 comprises a distinguishing section at least a part of which is constituted by a material which discolors by reaction with hydrogen sulfide. When hydrogen sulfide is generated from the battery 201, by contact of hydrogen sulfide with the distinguishing section, the distinguishing section discolors. Accordingly, by checking discoloration, it is possible to detect the presence or absence of hydrogen sulfide from the battery 201. As the distinguishing means 250, for instance, substantially the same one as the distinguishing means 150 of the second embodiment of the invention can be used. In other words, the distinguishing means 250 consists of the plug-in member and the supporting member, wherein the distinguishing section is provided to a part of the plug-in member. In this circumstance, when inserting the plug-in member to a position where the gas generated from the battery 201 can reach and checking discoloration of the distinguishing section, it is possible to distinguish the presence or absence of hydrogen sulfide from the battery 201. For example, as shown in FIG. 9, when a through-hole is made at a part of the duct 205 and the distinguishing means 250 is inserted into the through-hole, at a time of discharging the gas generated from the battery 201 through the duct 205, it is possible to surely make the gas contact with the distinguishing section of the distinguishing means 250; in the case where the discharged gas contains hydrogen sulfide, the distinguishing section discolors.

In this way, since the battery system 200 comprises: the housing 204 which functions as a fluid passage; the battery 201 containing a sulfur-based material and being incorporated in the housing 204; and the distinguishing means 250 at least a part of which discolors when chemically reacting with hydrogen sulfide at a downstream side of the fluid flow with respect to the battery 201, by checking the discoloration of the distinguishing means 250, it is possible to distinguish the presence or absence of hydrogen sulfide from the battery 201. Hence, deterioration of the battery 201 can be judged with a simple structure.

In the battery system 200 of the third embodiment, although an embodiment where the distinguishing means 250 is provided at a part of the duct 205 has been described, the distinguishing means is not limited to the mode. For instance, in the same manner as that of the battery 10 of the first embodiment, the distinguishing means may have a mode where the distinguishing member 30 is provided inside the duct 205 and the distinguishing member 30 can be observed from outside the duct 205 through the observation window. It should be noted that in view of easier exchange of the distinguishing means at a time of maintenance of the battery system 200, like the distinguishing means 250 (or the distinguishing means 150), the distinguishing means is preferably removably formed.

Moreover, in the battery system 200 of the third embodiment, it has been described that the distinguishing means 250 is provided at a part of the duct 205, the location of the distinguishing means 250 is not limited to this. The distinguishing means 250 may be provided at a downstream side of the fluid flow with respect to the battery 201 and where the gas generated from the battery 201 can reach. For example, the distinguishing means 250 may be provided at the outlet port 203 of the housing 204.

Further, although the battery system 200 of the third embodiment has been described as an embodiment having a fan or the like (not shown), as long as the gas generated from the battery 201 can reach the distinguishing means 250, the fan or the like is not necessarily required. It should be noted that in view of generating fluid flow intentionally in the housing 204 and making the gas generated from the battery 201 surely reach the distinguishing means 250, the fan or the like is preferably provided in the housing 204.

With regard to the battery system 200, at a time of using the battery 201 (when the battery system 200 is applied to a vehicle, at a time of driving the vehicle), discoloration of the distinguishing means 250 is monitored using an image-identifying machine, a reflectometer, or the like; when detecting an abnormal condition (discoloration), operation of the battery is automatically stopped to ensure the safety, or a visually-observable lump is lighted up to immediately inform the battery operator (e.g. a vehicle driver) of deterioration of the battery.

In the battery and the battery system according to the first to third embodiment, the distinguishing means may be located at a position where hydrogen sulfide generated from the power section or the battery can contact. However, as density of hydrogen sulfide is higher than that of the air (namely, hydrogen sulfide is heavier than the air), at a time of using battery and the battery system, the distinguishing means is preferably disposed at a position to be the lower side of the battery and the battery system. By the location, detection sensitivity regarding the presence or absence of hydrogen sulfide can be improved.

EXAMPLES

Hereinafter, the battery and the battery system of the invention will be more specifically described by way of the following examples.

(1) Example 1

Batteries as shown in FIGS. 1 to 3 were produced and the operation test was carried out.
(Formation of the Distinguishing Section)
A transparent polyethylene film having a thickness of 50 μm was cut into pieces having a size of 10 mm×10 mm; then, an area of 2.8 mm×2.8 mm on one surface of the film was sputter-coated with Cu to form the distinguishing section on the film. The thickness of the distinguishing section is about 50 nm.
(Adhesion into the Exterior Body)
As the exterior body, a laminated film (i.e. a biaxially-oriented film of polyamide resin/aluminum foil/polyethylene resin having a thickness of 20 μm/40 μm/50 μm.) was prepared. Then, a hole having an opening size of 3 mm×3 mm was made in the exterior body and the above Cu-deposited film was thermally-adhered such that the film covers the hole.
(Production of the Power Section)
$LiCoO_2$ and $Li_2S—P_2O_5$ were mixed at a ratio of 1:1 by volume %, the mixture was applied onto one surface of a cathode current collector made of an aluminum foil (thickness of 20 μm) at an area of 100 mm×100 mm to form a cathode layer; thus, a cathode sheet was produced. On the other hand, graphite carbon and $Li_2S—P_2O_5$ were mixed at a ratio of 1:1 by volume %, the mixture was applied onto one surface of an anode current collector made of a stainless steel film (thickness of 30 μm) at an area of 100 mm×100 mm to form an anode layer; thus, an anode sheet was produced. Further, $Li_2S—P_2S_5$ was applied over the anode layer to form a solid electrolyte layer on the anode layer. After that, the cathode sheet and the anode sheet having the solid electrolyte layer were superposed to form a power section. About the thickness of each layer, the cathode layer is 50 μm thick, the solid electrolyte layer is 40 μm thick, the anode layer is 70 μm thick. To each current collector of the produced power section, terminals made of a stainless steel having a size of 5 mm in width, 130 mm in length, and 0.05 mm in thickness were respectively welded to produce a cathode terminal and a anode terminal.
(Production of the Battery)
The produced power section was incorporated in the above laminated film and the periphery of the film was thermally-adhered to produce a battery.

(Operation Test and the Test Results)
To simulate deterioration of the battery, 150 mL of air (RL 70%) was repeatedly injected into the laminated film using a syringe. As a result, it was observed from outside the battery that the Cu-deposited membrane (film) in the laminated film discolored in bronze. Namely, by checking discoloration of the distinguishing means, generation of hydrogen sulfide in the battery could be easily detected from outside the battery.

(2) Example 2

Figure 10:
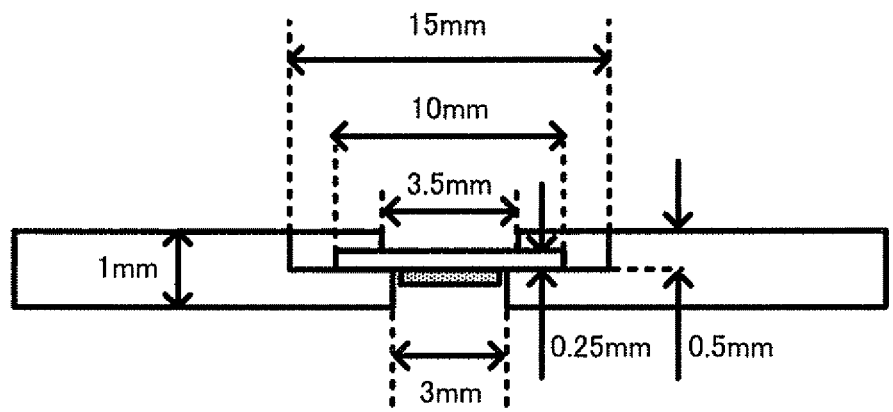
FIG. 10 is a plan for illustrating a structure of the battery of Example 2.

The battery as shown in FIG. 4 was produced and operation test was carried out.
(Formation of the Distinguishing Section)
On one surface of a transparent acrylic resin material having a size of 10 mm in diameter and 0.25 mm in thickness, Cu was applied in a sputtering manner at an area of 2.8 mm×2.8 mm to form a distinguishing section on the resin material. The thickness of the distinguishing section was about 50 nm. The Cu-deposited plate thus obtained was mounted on an aluminum member having a diameter of 15 mm and a thickness of 0.5 mm but also having a 3.5 mm diameter hole at substantially center portion of the aluminum member, to make a mode weldable to the below-described exterior body. The detailed specification is shown in FIG. 10.
(Placement of the Exterior Body)
As the exterior body, an aluminum housing (thickness of 1 mm) was prepared; a concave having a size of 15 mm in diameter and 0.5 mm in depth was made at apart of the exterior body. Then, a 3 mm diameter hole was made at a substantially center portion of the concave. Thereafter, the above aluminum member to which the Cu-deposited plate was mounted was fitted with the concave; then, the aluminum member and the housing were welded together to dispose the distinguishing means in the housing. The detailed specification is shown in FIG. 10.
(Production of the Power Section)
Except for forming the cathode layer or the anode layer on both side of the current collector, a power section having a cathode terminal and an anode terminal was produced in the same manner as Example 1.
(Production of the Battery)
The power section thus obtained was incorporated in the above housing, then, the lid was welded together with the housing.
(Operation Test and the Test Results)
To simulate deterioration of the battery, a through-hole was provided in advance to the housing, and the through-hole is covered with a tape. From the through-hole, 150 mL of air (RL 70%) was repeatedly injected into the laminated film using a syringe. As a result, it was observed from outside the battery that the Cu-deposited membrane (film) in the laminated film discolored in bronze. Namely, by checking discoloration of the distinguishing means, generation of hydrogen sulfide in the battery could be easily detected from outside the battery.

(3) Example 3

A plurality of battery was disposed in the housing of Example 2 and operation test thereof was carried out.
(Production of the Battery)
The power section of Example 1 was produced and the produced power section was incorporated in a substantially the same laminated film as that of Example 1 (but the distinguishing means was not provided). At this phase, to simulate deterioration of the battery during cell breakage, when thermally-adhering the periphery of the laminated film, 1 cm length non-adhered portion was provided. Four of the batteries (unit cells) thus obtained were prepared and connected to each other in series; then these batteries were incorporated in the housing of Example 2. It should be noted that the production of battery in Example 3 was carried out in a glove box under Ar atmosphere.

(Operation Test and the Test Results)

The battery thus obtained was taken out from the glove box; from a through-hole provided in advance to the housing, 150 mL of air (RL 70%) was repeatedly injected into the housing a syringe; then, the battery was left undisturbed. As a result, it was observed from outside the battery that the Cu-deposited membrane (film) discolored in bronze. Namely, by checking discoloration of the distinguishing means, generation of hydrogen sulfide in the battery could be easily detected from outside the battery.

(4) Example 4

A battery as shown in FIGS. 5 to 8 (but the controller was not mounted) was produced and the operation test thereof was carried out.

(Production of the Distinguishing Means)

A Cu foil having a diameter of 25 mm and a thickness of 15 μm was prepared, the Cu foil was sandwiched between a pair of polypropylene plates (30 mm×60 mm, thickness of 1 mm) each of which has a 20 mm diameter through-hole; followed by fixing to the aluminum supporting member (40 mm×20 mm×4 mm) to produce the distinguishing means.

(Placement of the Exterior Body)

As the exterior body, an aluminum housing (thickness of 1 mm) was prepared; a through-hole (2.5 mm×31 mm) was provided for removably inserting the distinguishing means, and the distinguishing means was inserted thereto. Finally, the distinguishing means was placed in the housing. Further, a through-hole was provided at a part of the housing and it was covered with a tape in the same manner as that of Example 2.

(Production of the Battery)

Four of the batteries (unit cells) were produced in the same manner as Example 3, and connected to each other in series; then these batteries were incorporated in the housing and the housing was closed by welding the lid together with the housing. It should be noted that the production of battery in Example 4 was carried out in a glove box under Ar atmosphere.

(Operation Test and the Test Results)

From a through-hole provided in advance in the housing, 150 mL of air (RL 70%) was repeatedly injected into the housing a syringe; then, the battery was left undisturbed. Later, when the distinguishing means was detached from the housing, it was found out that the Cu foil of the distinguishing means discolored in bronze. In other words, by checking discoloration of the distinguishing means, generation of hydrogen sulfide in the battery could be easily detected from outside the battery.

Example 5

By using the battery system as shown in FIG. 9 (but, the distinguishing means was disposed at a vicinity of the discharge blower arranged at an outlet port of the vehicle room), operation test was carried out.

(Production of the Distinguishing Means)

In the same manner as Example 4, the distinguishing means was produced. The obtained distinguishing means was disposed at a vicinity of the discharge blower arranged at an outlet port of the vehicle room.

(Production of the Battery)

The power section of Example 1 was produced and it was incorporated in the laminated film same as that of the Example 1 (but the distinguishing means was not provided). At this phase, to simulate deterioration of the battery during cell breakage, a hole was made in the laminated film and the hole was covered by a tape. By providing twenties of the batteries thus obtained and connecting them to each other in series, these batteries were incorporated in an aluminum pack case (thickness of 1.5 mm) to complete a battery (battery pack).

(Placement of the Battery)

The obtained battery (battery pack) was placed in the vehicle room.

(Operation Test and the Test Results)

The lid of the battery pack was opened and the tape stuck on the battery inside the battery pack was quickly peeled; immediately after that, the lid of the battery pack was closed. Later, breading-exhausting operation was carried out. Then, the distinguishing means was detached from the vehicle room; the Cu foil of the distinguishing means discolors in bronze. In other words, by checking discoloration of the distinguishing means, generation of hydrogen sulfide in the battery could be easily detected from outside the battery.

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that the battery and the battery system with such an alternation are included in the technical scope of the invention.

INDUSTRIAL APPLICABILITY

The battery and the battery system of the present invention exhibit excellent safety and reliability so that these can be used in various industrial fields from a small-sized power source such as a power source for mobile devices to a large-sized power source such as a power source for vehicles.

The invention claimed is:

1. A battery system comprising: a housing having an inlet port and an outlet port fluidly connected by a fluid passage; an all solid state secondary battery containing a Li-A-S based solid electrolyte material, wherein A is at least one element selected from the group consisting of: P, Ge, B, Si and I, the battery being arranged in the fluid passage; and a distinguishing means at least a part of which discolors when reacting with hydrogen sulfide, wherein the distinguishing means does not comprise an electrical connection and is removably provided at a downstream side of a fluid flow with respect to the battery.

2. The battery system according to claim 1, wherein at least a part of the distinguishing means is made of a material containing at least one selected from the group consisting of: Cu, Ni, Fe, Ag, Zn, Pb, and Mn.

* * * * *